United States Patent Office 3,438,912
Patented Apr. 15, 1969

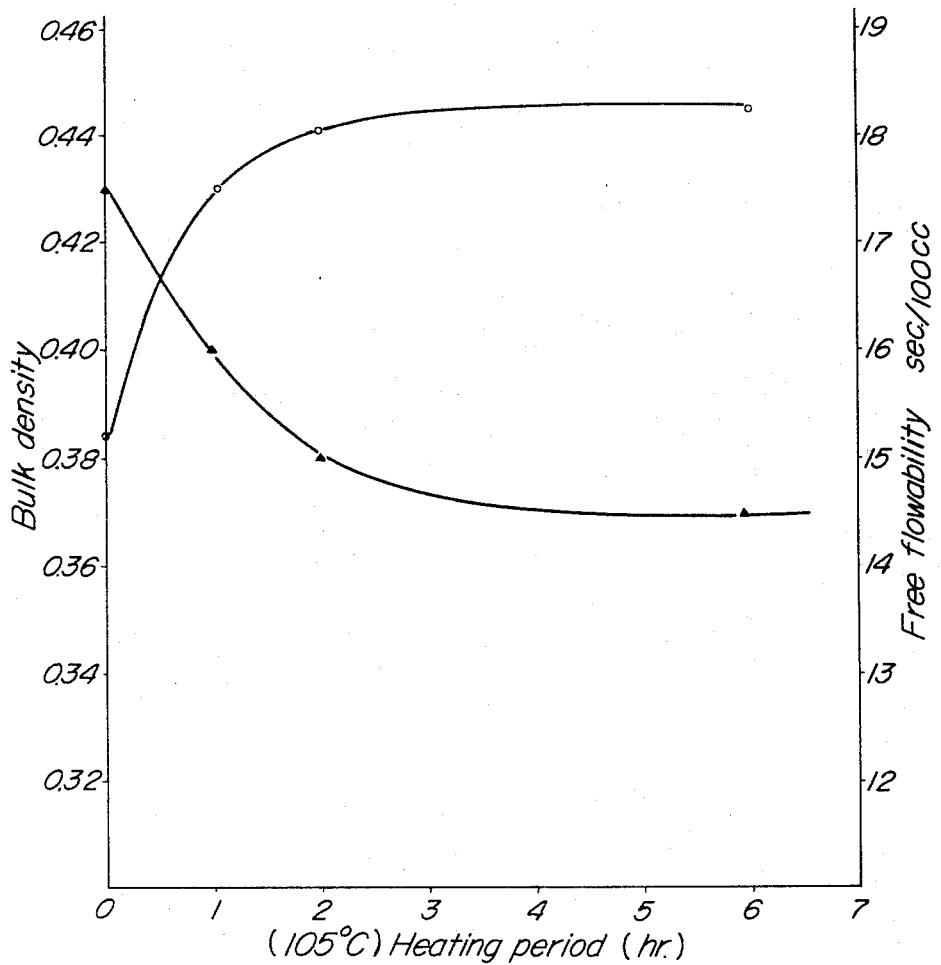

3,438,912
POROUS PLATE OF POLYVINYL CHLORIDE RESIN AND METHOD FOR PRODUCING THE SAME
Hiroshi Tsukamoto, Nishinomiya-shi, and Syunji Iwahashi, Toyonaka-shi, Japan, assignors to Sumitomo Chemical Company, Ltd., Osaka, Japan, a corporation of Japan
Filed Nov. 20, 1964, Ser. No. 412,663
Claims priority, application Japan, Nov. 22, 1963, 38/62,831
Int. Cl. C08f 47/08; B29g 27/08
U.S. Cl. 260—2.5     2 Claims

ABSTRACT OF THE DISCLOSURE

A porous, permeable sheet consisting essentially of a vinyl chloride polymer, free of plasticizer and stabilizer, characterized by a porosity of 35 to 70%, thickness of 0.3 to 0.8 mm., tensile strength of 0.15 to 1.5 kg./mm.$^2$, brittleness of 9 to 30 by measurement of JIS C-2311 and electric resistance of 0.0008 to 0.004 $\Omega$/dm.$^2$/mm., is produced by pre-heating with agitation a layer of a powdered vinyl chloride resin on a moving belt at a temperature of 70° to 300° C. for 72 hours to 2 minutes and then sintering the pre-treated powdered resin without pressing at a temperature of 160° to 350° C.

---

The present invention relates to a porous plate of polyvinyl chloride, copolymers mainly consisting of vinyl chloride or mixtures of these polymers, and to a method for producing the same. More particularly, it relates to a porous plate of polyvinyl chloride, copolymers mainly consisting of vinyl chloride or mixtures of these polymers, having continuous open cells, and to a method for producing the same.

The prior art discloses porous plates of the same polymers as employed in the present invention. Although they were of the open cell type, their cells were large and not uniform. Further, they were not satisfactory in mechanical strength and were as thick as 0.7 to 1.2 mm. The conventional plates were made of pulp immersed in phenol resin or of polyvinyl chloride and were prepared by an extraction or sintering process. In the extraction process a polymeric material, for example, polyvinyl chloride was compounded with a volatile solvent, and if desired with a plasticizer and then extruded in the form of a ribbed sheet which is passed through an oven at a temperature of 100° to 130° C. to remove the solvent. In the sintering process, powdered polyvinylchloride, sometimes with fillers or plasticizers, was metered on to a continuous stainless steel band and subjected to radiant heat to cause partial fusion and production of a microporous sintered sheet, which was automatically cut to size at the far end of the band. The sintering process gave a material with an average pore size in the region of 20$\mu$ and 50% volume porosity. There was a serious decrease in porosity of the sheet by sintering. The material was reported to be satisfactory as a battery separator.

The plates were used for liquid filtration, gas filtration, fluidization of powders, pneumatic silencing, orthopaedic splints and inking devices.

If the powder materials are strongly heated, the sintered product is small in porosity but great in mechanical strength, while if the materials are weakly heated, the product is large in porosity but low in mechanical strength. A product which is superior in porosity as well as mechanical strength has long been desired. To this effect, there have been many approaches by incorporating into the powder materials fillers such as inorganic powders and fibrous materials, plasticizers, or by controlling particle sizes or their distribution of the material or by applying compression and heating. However, any such approaches cannot provide but a thick porous product. If a thinner product is made, cracking will always occur.

It is an object of the present invention to provide a porous plate as thick as 0.3 mm. to 0.8 mm., having small cells, high porosity, high mechanical strength and continuous open cell structure of uniform capillary type without cracks and further having high cohering strength by controlling the shrinkage of the volume of the sintered product to be as small as possible during the course of the heat treatment.

It is another object of the present invention to provide a process for easily and efficiently preparing the porous plate by completely excluding such fatal defects as extreme decrease in porosity and formation of cracks, as the known processes have experienced.

It is a further object of the present invention to avoid the use of fillers or plasticizers.

It is a further object of the present invention to improve the sintering process. Other objects will be apparent from the following description.

The accompanying drawing shows a diagram of relation of bulk density, and free flowability and heating period, i.e., an effect of preheating on properties of powdery resin.

According to the present invention, powdery polyvinyl chloride materials are preheated in an atmosphere kept at 70°–300° C. for 72 hours to 2 minutes and the preheated materials are metered on a moving belt to form a film which is then sintered in an atmosphere kept at a temperature of 160°–350° C. for 30 minutes to 30 seconds. The resultant sintered product has 35–70% porosity. It is a feature of the present invention to preheat the powdery materials, before it is fed onto the moving belt, by which free flowability of the materials is improved to make formation of the film ready. In the present specification, "porosity" means percentage of volume of cells to that of the product.

The powdery polyvinyl chloride resin employed in the present invention includes polyvinyl chloride obtained by suspension, emulsion and block polymerizations, copolymers of vinyl chloride, with vinyl acetate, vinylidene chloride, vinyl ethers of higher aliphatic acids and vinyl esters of higher aliphatic acids. Polyvinyl chloride prepared by emulsion polymerization is most preferable. A mixture of the above may be used. Average polymerization degree of 600–1800 may be preferred.

The materials are first preheated or calcined in an atmosphere kept at a temperature of 70° to 300° C. for 72 hours to 2 minutes.

Preferable conditions are illustratively shown in the following Table 1 for the polyvinyl chloride powder obtained by emulsion polymerization and having polymerization degree of 1300.

TABLE 1

| Temperature (° C.) | Time | Bulk density |
|---|---|---|
| Non-treated | | 0.29 |
| 200 | 10 min | 0.416 |
| 160 | 40 min | 0.344 |
| 90 | 48 hrs | 0.330 |

Any means may be employed for the heating. Fusion of small particles, for example, less than 10$\mu$ in size, occurs at their surfaces so that small particles adhere together. Some particles become spherical or are granulated or shrunk. Agitation or vibration should be used to inhibit excessive adhesion of the particles. The calcined products are sieved to pass 60 mesh (Tyler).

The preheated particles are fed by gravity from a hopper onto a moving belt and the thickness of the layer formed is controlled by a doctor knife, a roll or any other means provided apart from the hopper. The porosity of the layer formed is between 50 and 80%. The material is then passed through such heating means as an oven to effect sintering. The sintering is carried out at 160°–350° C. for 30 minutes to 30 seconds, with the result that porosity of the sintered product is reduced to 35–70%. We do not intend to limit the heating apparatus to those mentioned above. No cracking is seen even in a thin sheet as thick as 0.3 mm. Mechanical and electrical properties of the sintered product are as follows:

Tensile strength _____kg./mm.$^2$__  0.15–1.5
Brittleness (as determined by test JIS C–311) _____  9–30
Resistance _____ohms/dm.$^2$/mm___  0.0008–0.004

The following examples are illustrative of the present invention and are not intended to limit the scope of the present invention.

EXAMPLE 1

A polyvinyl chloride resin powder (2 kg.) produced by emulsion polymerization and having average polymerization degree value of 1300 (Sumilit PX. A, a trade name and a product of Sumitomo Chemical Co., Ltd.), was charged and stirred in an aluminum dish with about 10 cm. thick and preheated in a heating furnace with hot air adjusted at a temperature of 120° C.±5° C. for about 20 minutes. The thus preheated powder was sifted with 150 mesh Tyler standard sieve. Particle diameter average was reduced from 72.6 micron to 60.5 micron.

The powder passed through the 150 mesh sieve was spread on an aluminum plate 1 mm. thick, 150 mm. long and 150 mm. broad. Then, the powder was smoothed by a knife kept at a height 0.9 mm., whereby uniform powder layer 0.9 mm. thick and having a porosity of 78% was formed.

The powder layer, on the aluminum plate was heated in a heating furnace with hot air adjusted at a temperature of 280° C.±5° C. for 2 minutes and 45 seconds. After heating, thus heat-treated powder layer was taken out from the furnace and cooled to the room temperature and peeled off from the aluminum plate. A porous plate was obtained, which was 0.6 mm. thick and had a porosity of 55%. The cell structure of the porous plate, as determined by microscopic observation was random and without straight passages between the surfaces.

The thus obtained porous plate presented a uniform sand like surface, and possessed no cracks and no direct holes which directly transmitted light when such was projected against the surfaces.

The mechanical strength and electric property of the porous plate were tested according to the test (JIS C–2311), and the results were brittleness value of 9.8 and tensile strength of 0.5 kg./mm.$^2$, and the electric resistance was 0.0008 Ω/dm.$^2$/mm.

In case when the heat-treatment of the same powder layer was conducted by shortening the heating period of time to 2 minutes, brittle porous plate having porosity of 65% was obtained. And in case when the period of time was prolonged to 3 minutes 20 seconds, a porous plate having innumerable cracks and porosity of 30% was obtained.

When non-preheated powder was employed, the uniform powder layer could not be formed by smoothing the surface with a knife because of the cohesive property of the non-preheated powder.

The powder layer could be formed by vibrating and pressing after the non-preheated powder was spread on the aluminum plate, however, porosity of the powder layer was 40%. The thus formed powder layer was heat treated as described above, and a porous plate having innumerable large cracks was obtained.

EXAMPLE 2

A polyvinyl chloride resin powder produced by suspension polymerization and having average polymerization degree value of 800 (Sumilit SX. 8, a trade name and a product of Sumitomo Chemical Co., Ltd.), was pre-heated in a fluidized bed heating apparatus using a hot air stream at 250° C. for about 5 minutes, cooled to room temperature, and sifted with 100 mesh Tyler standard sieve.

A powder layer of 1.2 mm. thickness and having porosity of 65% was formed on an aluminum plate with the thus preheated powder passed through a 100 mesh sieve, in the similar way as described in Example 1. The thus formed powder layer was heat-treated in a heating furnace with hot air adjusted at a temperature of 290°±5° C. for 2 minutes and 30 seconds. Thus a porous plate of 0.9 mm. thickness and porosity of 52% was obtained.

In case when the sintering procedure was conducted by employing non-preheated powder passed through 100 mesh sieve, a brittle porous sheet having innumerable cracks and direct holes was obtained.

EXAMPLE 3

A poly vinyl chloride resin powder produced by emulsion polymerization and having average polymerization degree value of 1300 (Sumilit HX. 13, a trade name and a product of Sumitomo Chemical Co., Ltd.), was preheated in a fluidized bed heating apparatus using a hot air stream at 220° C. for about 3 minutes, cooled to room temperature and sifted with a vibrating 100 mesh Tyler standard sieve.

A fixed amount of the powder after passing through the 100 mesh sieve was continuously supplied to a moving steel belt and leveled by a knife kept at a height of 0.9 mm., resulting in a continuous, smooth powder layer of 0.9 mm. thick and having porosity of 68%. The thus formed powder layer was passed through a tunnel shaped heating furnace with hot air kept at a temperature of 250° C.±15° C. for about 4 minutes, resulting in a continuously heat treated porous sheet of 0.7 mm. thickness and having a porosity of 58%.

The mechanical strength and electric property of the porous plate were tested according to the test (JIS C–2311), and the results were brittleness value of 13.7 and tensile strength of 0.15 kg./mm.$^2$, and the electric resistance was 0.00103 Ω/dm.$^2$/mm.

When the sintering procedure was conducted by employing non-preheated powder passed through a 100 mesh sieve, a porous sheet having innumerable cracks and direct holes was obtained.

EXAMPLE 4

1 kg. of a mixture of 70% by weight of polyvinyl chloride having average polymerization degree of 1100 prepared by emulsion polymerization and 30% by weight of vinyl chloride-vinyl acetate copolymer (5% vinyl acetate) having average polymerization degree of 1000 prepared by emulsion polymerization was preheated with agitation in an atmosphere at 160° C. for about 10 minutes in an aluminum dish (30 cm. in diameter). The copolymer was cooled and then sieved by means of Tyler sieve to collect —80 mesh particles. The particles were treated as in Example 2 to form a layer (1 mm. thick, porosity 60%) on an aluminum plate. The layer was continuously passed through a hot-air blast oven at 220°±5° C. for 3 minutes and 30 seconds. A porous sheet of 0.7 mm. thick, 56% in porosity was produced. Without the preheating, a porous sheet (0.8 mm. thick, 48% in porosity) was obtained.

EXAMPLE 5

200 g. of polyvinyl chloride having average polymerization degree of 1200, prepared by emulsion polymerization, was fed into an aluminum dish (200 mm. in diameter) and preheated at 200° C. for 3 minutes. The preheated resin was sieved using a Tyler sieve to collect —150 mesh particles, whose free flowability was raised from 45 sec./100 cc. to 30 sec./100 cc. and bulk density is changed from 0.468 to 0.472. The particles was formed to make a layer 0.6 mm. thick which passed through a hot air blast oven at 250° C. for 3 minutes. A porous sheet of 0.37 mm. thickness, 44.8% porosity, 1.12 kg./mm.² tensile strength was obtained. Without the preheating, a porous plate was obtained, whose porosity was 36.3% and tensile strength was 0.3 kg./mm.².

The above free flowability was measured using an apparatus described in JIS K–6721, used for bulk density, in which the time, in seconds, required for 100 cc. of a sample of the particles to flow down from a funnel by gravity is measured.

What we claim is:

1. A process for preparing a permeable sheet of a vinyl chloride polymer which comprises, pre-heating a powdered polymer of vinyl chloride free of plasticizer and stabilizer, at a temperature of 70° to 300° C. for from 2 minutes to 72 hours with agitation, whereby the particle size of the powder is reduced and the free flowability is increased, forming a layer of the thus-treated polymer powder, and then sintering the same at a temperature of 160°–350° C. without pressing.

2. A process according to claim 1, wherein the sintering step is conducted for from 30 seconds to 30 minutes.

References Cited

UNITED STATES PATENTS 3,285,864   11/1966   Abell et al.
2,371,868   3/1945   Berg et al.

FOREIGN PATENTS 750,239   6/1956   Great Britain.

MURRAY TILLMAN, *Primary Examiner.*

W. J. BRIGGS, SR., *Assistant Examiner.*

U.S. Cl. X.R.

136—146; 264—126